United States Patent [19]  [11] 4,386,745
Patel et al.  [45] Jun. 7, 1983

[54] TENSION RELIEVER FOR SEAT BELT RETRACTOR

[75] Inventors: Chimanbhai M. Patel, Troy; Joseph J. Magyar, Rochester; David N. Lee, Almont, all of Mich.

[73] Assignee: General Motors Corporation, Detroit, Mich.

[21] Appl. No.: 291,284

[22] Filed: Aug. 10, 1981

[51] Int. Cl.³ ...................... B65H 75/44; B65H 75/48
[52] U.S. Cl. ...................... 242/107.4 B; 242/107.4 A; 242/107.6
[58] Field of Search ................ 242/107.4 A, 107.4 B, 242/107.6; 280/806; 297/478

[56] References Cited

U.S. PATENT DOCUMENTS

| | | | |
|---|---|---|---|
| 3,491,966 | 1/1970 | Curran et al. | 242/107.4 |
| 3,550,875 | 12/1970 | Settimi | 242/107.4 |
| 3,700,184 | 10/1972 | Francis | 242/107.4 |
| 3,869,098 | 3/1975 | Sprecher | 242/107.6 X |
| 3,917,189 | 11/1975 | Bryll | 242/107.48 |
| 4,198,011 | 4/1980 | Kamijo | 242/107.7 |

Primary Examiner—Stuart S. Levy
Assistant Examiner—Lloyd Doigan
Attorney, Agent, or Firm—Charles E. Leahy

[57] ABSTRACT

A belt reel journaled on the retractor frame carries a ratchet plate having teeth including a front face and a back face. A pawl mounted on the frame is movable from a normal disengaged position to a position engaging either the unwinding facing front side of a tooth or engaging with the winding facing side of a tooth. A normally stationary clutch member is connected to the pawl by a cam and is selectively rotated in response to a sensed condition so that the cam moves the pawl to engage the unwinding facing side of a tooth to lock the reel against belt unwinding rotation. A manual operating handle is provided to rotate the clutch member independent of occurrence of the sensed condition so that the pawl is moved into engagement with the winding face side of a ratchet tooth to block belt winding reel rotation by a reel windup spring and hold the belt at a tension free slackened length about the seat occupant. The cam connection between the clutch member and the pawl blocks the pawl against movement to the disengaging position and also blocks the clutch member against return movement in the unwinding direction until a subsequent slight belt unwinding rotation cancels the tension relieving mechanism.

3 Claims, 4 Drawing Figures

TENSION RELIEVER FOR SEAT BELT RETRACTOR

The invention relates to a tension reliever for a seat belt retractor and more particularly provide a manually set tension reliever for a retractor having a belt acceleration sensitive locking mechanism actuated in response to a predetermined rotary acceleration of the reel in the belt unwinding direction induced by rapid unwinding of the belt.

BACKGROUND OF THE INVENTION

It is well known to provide a seat belt retractor in which a reel is locked against belt unwinding rotation by a pawl which is pivoted to engage with ratchet teeth provided on the reel.

It is also known to provide mechanism for moving the pawl to the ratchet teeth engaging position in response to a sensed velocity or acceleration of belt unwinding reel rotation. Such a retractor typically has a clutch member which is rotatably mounted on the end of the reel shaft and has an arm which is engageable with the pawl. The clutch member remains stationary during normal winding and unwinding of the belt so that the pawl remains disengaged from the ratchet teeth. A clutch pawl is carried on the end of the reel shaft normally disengaged from the clutch member but is movable into engagement with ratchet teeth on the clutch member by centrifugal forces acting on the clutch pawl or by the lagging rotation of an inertia wheel rotatably mounted on the reel.

It is also well known to provide a tension reliever for locking a belt reel against belt winding rotation so that the belt is held in a tension free slackened length about the occupant. Such tension relief mechanisms typically comprise an auxiliary ratchet plate carried by the wheel and a pawl which is moved to engage the ratchet teeth so that the reel is held against belt winding rotation.

SUMMARY OF THE INVENTION

According to the present invention, a belt reel journaled on the retractor frame carries a ratchet plate having a plurality of teeth including a front face facing in the belt unwinding direction and a back face facing in the belt winding direction. The windup spring biases the reel in the belt winding direction. A pawl mounted on the frame is movable from a normal disengaged position to an engaged position engaging with either the unwinding facing side of a tooth to prevent belt unwinding or engaging with the winding facing side of a tooth to prevent belt winding. A normally stationary clutch member is connected to the pawl by a cam. A clutch pawl mounted on the reel is selectively moved in response to a sensed condition to engage ratchet teeth provided on the clutch member and rotate the clutch member in the unwinding direction so that the cam moves the pawl to engage the unwinding facing side of the teeth to lock the reel against belt unwinding rotation. A manual operating handle is provided to rotate the clutch member in the belt unwinding direction so that the pawl is moved into engagement with the winding face side of the ratchet teeth to block belt winding rotation of the reel by the windup spring and hold the belt at a tension free slackened length about the seat occupant. The cam connection between the clutch member and the pawl blocks the pawl against movement to the disengaging position and also blocks the clutch member against return movement in the unwinding direction until a subsequent initiation of belt unwinding rotation cancels the tension relieving mechanism.

One object, feature and advantage of the invention resides in the provision of a tension relieving mechanism for a belt sensitive locking retractor in which the lock bar is movable to engage the back side of the ratchet teeth to lock the reel against belt winding rotation so that the belt is held at a tension free length.

Another object, feature and advantage of the invention resides in the use of a manually actuated pushbutton to effect rotation of the cup-shaped pawl clutch member so that the pawl is moved into engagement with the back side of the ratchet teeth to lock the reel against belt winding rotation by the windup spring.

Another object, feature and advantage of the invention resides in the provision of cam means acting between the pawl and the clutch member so that the pawl is locked against movement to the ratchet plate disengaging position and the clutch member is blocked against movement in the pawl releasing direction until a subsequent initiation of belt unwinding reel rotation carries the ratchet tooth away from engagement with the pawl.

DESCRIPTION OF THE DRAWINGS

These and other features, objects and advantages of the invention will become apparent upon consideration of the specification and the appended drawings in which.

DESCRIPTION OF THE PREFERRED EMBODIMENT

Figure 1:
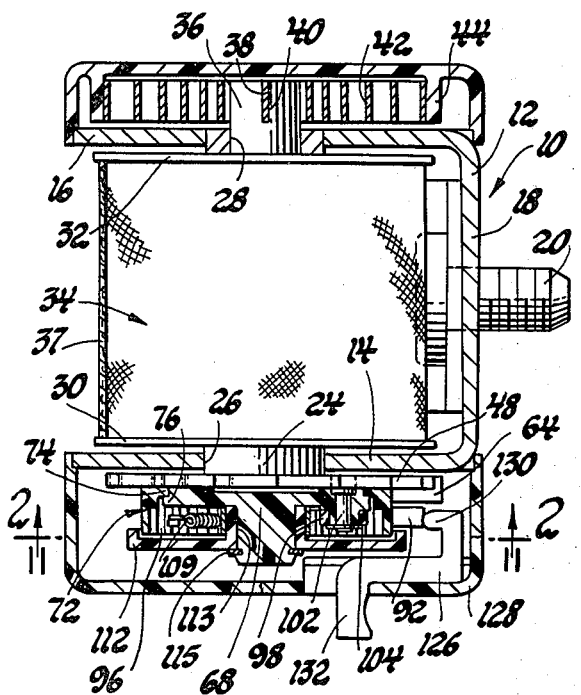
FIG. 1 is a plan view of the retractor having parts broken away in sections.

Referring to FIG. 1, a seat belt retractor indicated generally at 10, includes a stamped steel frame 12 including laterally spaced side walls 14 and 16 integral with a base 18. A mounting bolt 20 and a mounting pin 22, best shown in FIG. 2, project from the base wall 18 for mounting the retractor assembly 10 on a vehicle body.

A reel shaft 24 extends through aligned apertures 26 and 28 of the frame walls 14 and 16 and carries end flanges 30 and 32 which cooperate with the reel shaft 24 to define a reel assembly 34 upon which an occupant restraint belt 37 is wound. The end 36 of reel shaft 24 extends outwardly through the frame wall 16 and has a slot 38 which receives the inner end 40 of a spiral windup spring 42. The outer end of the windup spring 42 is suitably anchored on a plastic spring housing 44. The windup spring 42 urges rotation of the reel 34 in the belt winding counterclockwise direction as viewed in FIG. 2.

Figure 2:
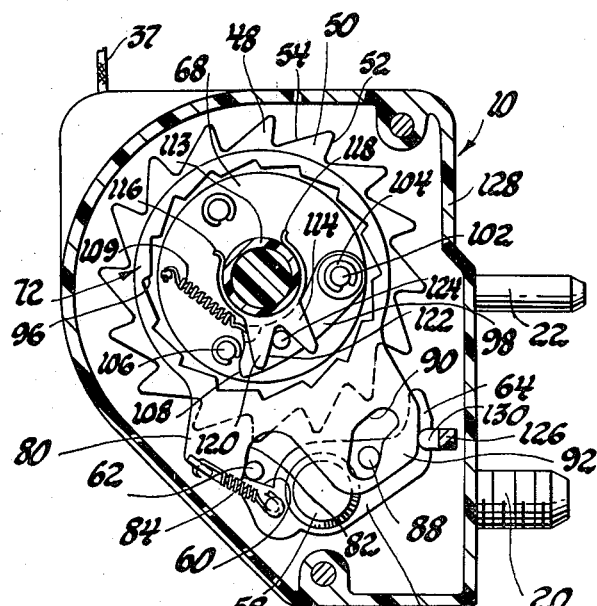
FIG. 2 is a sectional view taken in the direction of arrows 2—2 of FIG. 1 and showing the retractor in the normal unlocked condition permitting belt winding and unwinding rotation of belt reel.

Referring to FIGS. 1 and 2, it is seen that a ratchet plate 48 is suitably attached to the reel shaft 24 for rotation therewith. As viewed in FIG. 2, the ratchet plate 48 has a plurality of circumferentially spaced ratchet teeth 50, each tooth having a front face 52 facing in the belt unwinding direction and a rear face 54 which faces in the belt winding direction of rotation.

A pawl 56 is pivotally mounted on the side wall 14 by a pivot pin 58. The pawl 56 has a stop face 60 which seats against a stop pin 62 provided on the side wall 14 to position the pawl 56 at the normal position of FIG. 2 in which a lock tooth 64 of the pawl 56 is spaced away from the ratchet teeth 50.

Figure 4:
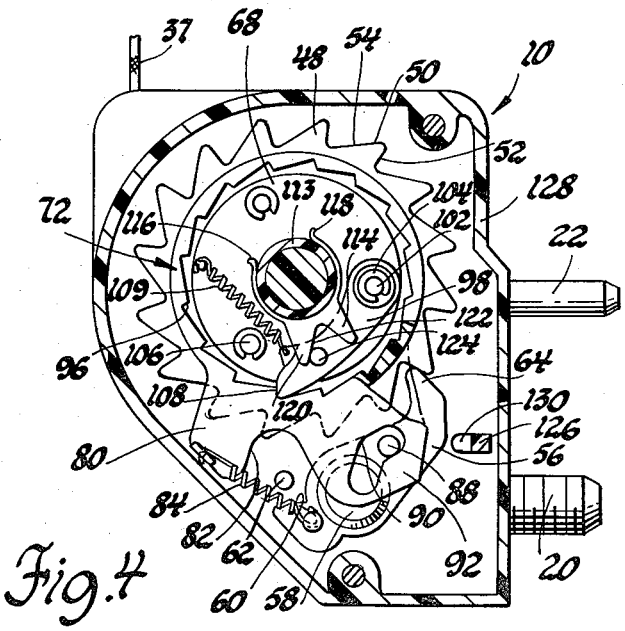
FIG. 4 is a view similar to FIGS. 2 and 3 but showing the lock bar moved into engagement with the front side of the ratchet teeth so that the belt reel is held against belt unwinding rotation for restraint of an occupant on the seat.

A sensing and lock bar actuating mechanism is provided for selectively moving the pawl 56 into engagement with the ratchet teeth 50 as shown in FIG. 4. As best seen in FIG. 1, a molded plastic reel extension 68 is fixedly attached to the ratchet plate 48 for rotation with reel 34. A cup-shaped clutch member 72 has an inner peripheral flange 74 which seats beneath a flange 76 on the reel extension 68 to journal the clutch member 72 for rotary movement relative the ratchet plate 48 and the reel extension 68. Referring to FIG. 2, it is seen that the clutch member 72 includes a stop arm 80 having a stop face 82 which seats against the stop pin 62. A coil tension spring 84 has one end anchored on the pawl 56 and the other end anchored on the stop arm 80 to maintain the clutch member 72 and the pawl 56 at their respective normal positions of FIG. 2.

As best seen in FIG. 2, the clutch member 72 and pawl 56 are connected by a pin 88 which extends from the face of the pawl 56 and projects through a curved cam slot 90 provided in a cam arm 92 of the clutch member 72.

The reel 34 and clutch member 72 are selectively coupled together by a clutch pawl 98 and a plurality of circumferentially spaced ratchet teeth 96 on the inner peripheral surface of the cup-shaped clutch member 72. The clutch pawl 98 is of molded plastic and is mounted on the reel extension 68 by a pivot pin 102 and a retaining ring 104. The clutch pawl 98 is held at a normal position engaging a stop 106 by a coil tension spring 109 having one end connected to the clutch pawl 98 and the other end connected to the reel extension 68. The normal FIG. 2 position of the clutch pawl 98 establishes a pawl tooth 108 away from the ratchet teeth 96 of clutch member 72.

As best seen in FIG. 1, a molded plastic flywheel 112 includes a hub 113 which rotatably seats upon the reel extension 68 and is retained thereon by a retaining ring 115. As best seen in FIG. 2, a cam clip 114 of stamped steel includes legs 116 and 118 which snap around the hub 113 of inertia flywheel 112 to couple the cam clip 114 with the inertia flywheel 112. The cam clip 114 also has a bifurcated arm 120 which defines a cam surface 122 contacting a cam follower pin 124 molded integral with the clutch pawl 98. Accordingly, rotary motion of the flywheel 112 and the cam clip 114 relative the clutch pawl 98 causes the cam surface 122 to throw the clutch pawl 98 radially outwards so that its pawl tooth 108 engages the ratchet teeth 96 of clutch member 72.

Retractor Operation for Restraint of Seated Occupant

In the event of a rapid vehicle deceleration, the forward momentum of the occupant causes unwinding of the belt 37 from the retractor assembly 10 and rotary acceleration of the reel 34. At a predetermined level of reel rotary acceleration, the resting inertia of the flywheel 112 causes the flywheel to lag behind the clockwise unwinding rotation of the reel 34 and the reel extension 68. Accordingly, the cam clip 114 mounted on the flywheel 112 lags behind the rotation of the clutch pawl cam follower pin 124 so that the cam surface 122 of the cam clip 114 throws the clutch pawl 98 radially outward to the position of FIG. 4. The clutch pawl tooth 108 engages one of the ratchet teeth 96 of the clutch member 72 so that an additional increment of unwinding rotation of the reel 34 and the clutch pawl 98 therewith causes a clockwise rotation of the clutch member 72 to the position shown in FIG. 4. The clockwise rotation of the clutch member 72 causes the curved cam slot 90 of the clutch pawl 98 to raise the pawl 56 to the FIG. 4 position engaging the unwinding facing front side 52 of one of the ratchet teeth so that the reel 34 is locked against further rotation in the belt unwinding direction.

Upon cessation of an occupant restraint load upon the belt 37, the windup spring 42 rotates the reel 34 in the belt winding direction so that the clutch pawl 98 can disengage from the clutch member ratchet teeth 96 and both the clutch member 92 and pawl 56 can be returned to their normal FIG. 2 positions by the coil tension spring 84.

Retractor Operation for Tension Relief

Referring again to FIGS. 1 and 3, it is seen that an operating handle 126 is movably mounted within a plastic cover 128 and includes an operating tab 130 which is engageable with the cam arm 92 of clutch member 72. The operating handle 126 also includes a finger button 132 which is pulled by the operator when it is desired to establish the belt 37 at a tension free slackened length about the occupant.

Figure 3:
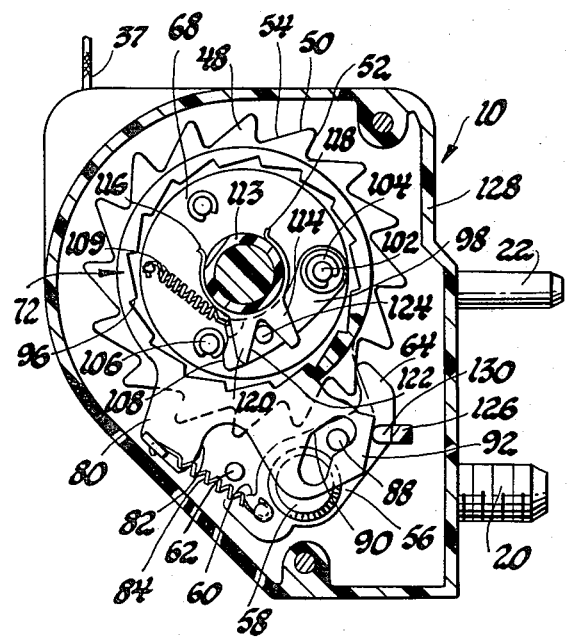
FIG. 3 is a view similar to FIG. 2 but showing the lock bar moved into engagement with the back side of the ratchet teeth to lock the reel against belt winding rotation so that the belt is held in the tension free slackened length.

Referring to FIG. 3, it is seen that pulling on the operating handle 126 causes its operating tab 130 to rotate the clutch member 72 in the clockwise direction. Accordingly, the curved cam slot 90 of the clutch member 72 acts upon the pawl pin 88 to raise the pawl 56 to the position of FIG. 3. The winding spring 42 causes counterclockwise winding rotation of the ratchet plate 48 so that the winding facing side 54 of one of the ratchet teeth 48 engages against the tooth 64 of the pawl 56 to lock the reel 34 against further rotation in the belt winding direction.

Referring to FIG. 3, it will be understood that the relationship between the cam slot 90 and the pawl pin 88 is such that the cam slot 90 retains the pawl 56 at the locking position of FIG. 3 and also blocks the clutch member 72 against return movement in the counterclockwise direction even though the operating handle 126 is released from contact with the clutch member 72. Accordingly, the belt 37 is held at a tension free length against windup until the occupant initiates a slight unwinding rotation of the reel by pulling on the belt 37. Such a slight unwinding rotation of the reel 34 unloads the winding facing side of the tooth 64 from engagement with the pawl 56 so that the coil tension spring 84 is permitted to return the pawl 56 and the clutch member 72 to their normal positions of FIG. 2.

Thus, it is seen that the invention provides a new and improved manually set tension reliever for a seat belt retractor.

The embodiments of the invention in which an exclusive property or privilege is claimed are defined as follows:

1. A seat belt retractor comprising:
   a belt reel rotatably journaled on a frame and having a toothed ratchet plate carried by the reel, each tooth including one side facing in the belt unwinding direction and another side facing in the belt winding direction;
   a spring biasing the reel in the belt winding direction;
   a pawl normally disengaged from the ratchet plate to permit belt winding and unwinding rotation of the reel and movable to an engaged position for engagement by the unwinding facing side of the teeth upon attempted belt unwinding to prevent unwinding rotation of the reel or for engagement by the winding facing side of the teeth upon winding rotation by the spring to prevent winding rotation;
   a clutch member mounted for rotary movement relative the reel and operably connected with the pawl to move the pawl to the engaged position upon clutch member rotation in the unwinding direction from a rest position;
   coupling means selectively coupling the reel with the clutch member in response to a sensed emergency condition and unwinding reel rotation so that initiation of reel unwinding by occupant restraining load moves the pawl into engagement with the unwinding facing side of the teeth to prevent unwinding reel rotation; and
   operating means operable to rotate and maintain the clutch member in the belt unwinding direction independently of the coupling means so that the pawl is moved to and maintained in the engaged position for engagement with a winding facing side of one ratchet plate tooth to block belt winding rotation of the reel by the spring so that the belt is held at a tension free slackened length about the seat occupant.

2. A seat belt retractor comprising:
   a frame;
   a belt reel journaled for belt winding and unwinding rotation on the frame;
   a ratchet plate rotatable with the reel and having a plurality of teeth thereon including one side facing in the belt unwinding direction and another side facing in the belt winding direction;
   a windup spring biasing the reel in the belt winding direction;
   a pawl movable from a disengaged position permitting belt winding and unwinding rotation of the reel to an engaged position engaging with either the unwinding facing side of the teeth to prevent unwinding rotation of the belt or engaging with the winding facing side of the teeth to prevent winding rotation; p1 a clutch member mounted for rotary movement relative the reel and operably connnected with the pawl to move the pawl to the engaged position upon clutch member rotation in the unwinding direction from a rest position ;
   coupling means selectively coupling the reel with the clutch member in response to a sensed condition and unwinding reel rotation so that the pawl is moved into engagement with the unwinding facing side of the teeth to prevent unwinding reel rotation;
   operating means adapted to rotate the clutch member in the belt unwinding direction independently of the coupling means so that the pawl is moved into engagement with winding facing side of the ratchet plate tooth to block belt winding rotation of the reel by the windup spring to hold the belt a tension free slackened length about the seat occupant; and
   blocking means acting between the clutch member and the pawl by which the pawl is blocked against movement to the ratchet plate disengaging position and the clutch member is blocked against movement in the unwinding direction until a subsequent initiation of belt unwinding reel rotation carries the winding facing side of the tooth away from engagement with the pawl to relieve the loading of the pawl against the clutch member and permit return of the clutch member to the rest position and return of the pawl to the normal disengaged position.

3. A seat belt retractor comprising:
   a frame;
   a belt reel journaled for belt winding and unwinding rotation on the frame;
   a ratchet plate rotatable with the reel and having ratchet teeth including one side facing in the belt unwinding direction and another side facing in the belt winding direction;
   a windup spring biasing the reel in the belt winding direction;
   a pawl normally disengaged from the ratchet plate to permit belt winding and unwinding rotation of the reel and movable to an engaged position for engagement by the unwinding facing side of the teeth to prevent unwinding rotation of the belt or for engagement by the winding face side of the teeth upon reel winding rotation by the spring to urge return of the pawl toward the disengaged position;
   a clutch member mounted for rotary movement relative the reel and having a normal rest position;
   cam means acting between the pawl and the clutch member to move the pawl to the engaged position upon clutch member rotation in the unwinding direction;
   coupling means selectively coupling the reel with the clutch member in response to a sensed emergency condition and unwinding reel rotation so that the clutch member is rotated in the unwinding direction and the pawl is moved into engagement with the unwinding facing side of the teeth to prevent unwinding reel rotation;
   operating means operable to rotate the clutch member in the belt unwinding direction independently of the coupling means so that the pawl is moved into engagement with winding facing side of the ratchet plate tooth to block belt winding rotation of the reel by the winding spring to hold the belt at a tension free slackened length about the seat occupant; and
   said cam means being effective to block the pawl against movement to the ratchet plate disengaging position and block the clutch member against movement in the unwinding direction to the rest position so that the belt is held at the tension free slackened length until a subsequent initiation of belt unwinding rotation carries the winding facing side of the tooth away from engagement with the pawl to relieve the loading imposed on the pawl and clutch member via the cam means and permit return of the clutch member to the rest position and return of the pawl to the normal disengaged position.

* * * * *